[redacted]
R J Morrison.
Additional imp. Mower.
No 158
Reg - 16,244
Patented Jan. 20 1857
BEST AVAILABLE COPY
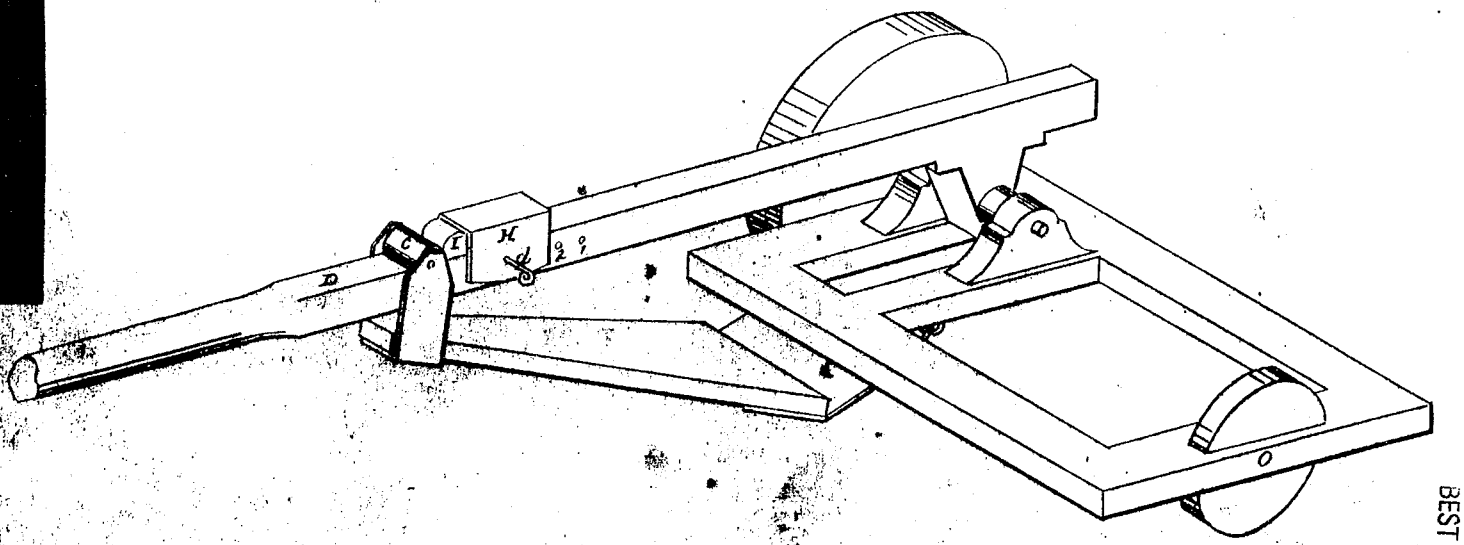
[redacted]